March 17, 1931. H. D. GEYER 1,796,926
WINDSHIELD WIPER BLADE
Filed April 30, 1928

Inventor
Harvey D. Geyer
By Spencer Hardman & Fehr
his Attorney

Patented Mar. 17, 1931

1,796,926

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

WINDSHIELD-WIPER BLADE

Application filed April 30, 1928. Serial No. 274,054.

This invention relates to windshield wipers having a wiping blade which travels back and forth in wiping contact with the glass surface.

An object of this invention is to provide a wiper blade having a wiping edge increasing in thickness from the end of small travel to the end of larger travel, whereby equalization of wear and greater smoothness and efficiency of operation is obtained.

Another object is to provide a wiper blade of molded soft rubber having a metal back, the rubber having an integral longitudinal bead abutting the metal back and being thereby stiffened so as to prevent adrupt flexure of the rubber blade at the edge of the metal. This longitudinal bead also prevents any possibility of the edge of the metal back contacting with the glass and scratching same when the blade becomes worn in use or when it is improperly adjusted.

Further objects and advantages of the present invention will be apparent from the following description, reference being had to the accompanying drawings, wherein a preferred form of embodiment of the present invention is clearly shown.

In the drawings.

Similar reference characters refer to similar parts thruout the several views.

Figure 1:
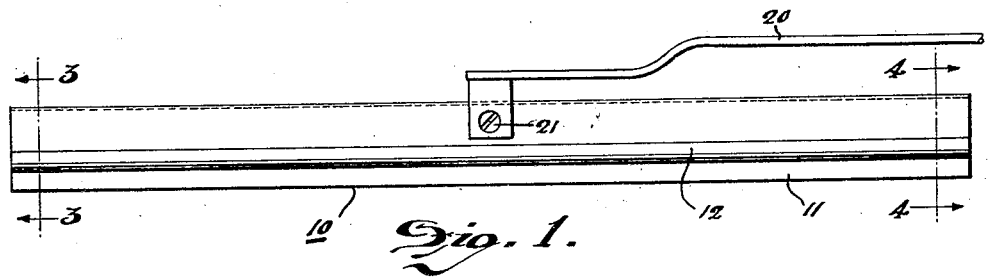
Fig. 1 is a side elevation of a wiper blade built according to this invention.
Figure 2:
Fig. 2 is a view looking directly at the wiping edge and shows its tapered thickness.
Figure 3:
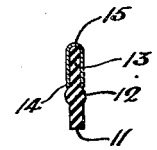
Fig. 3 is a section on line 3—3 of Fig. 1.
Figure 4:
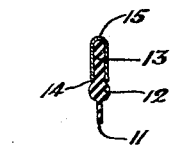
Fig. 4 is a section on line 4—4 of Fig. 1.

Numeral 10 designates in its entirety the molded soft rubber blade, 11 its wiping edge, 12 a longitudinal thickened portion or bead therein, and 13 the back edge of the molded rubber blade.

After blade 10 is molded to the form clearly illustrated, it is provided with the U-section steel stamping 15 which serves as a stiffening rigid member for blade 10. This metal back 15 may be suitably fixed to blade 10 by simply slipping it over the rubber portion 13 and then clinching it thereupon. The oscillating arm 20 is pivotally attached to the center of the metal back 15 by the small screw 21, or by any other suitable means. Arm 20 has an oscillatory swinging movement about a pivot shaft (not shown), as is well-known in such windshield wipers.

In operation it will be obvious that the inner end 16 of the wiper blade will have a much less travel distance than the opposite or outer end 17 thereof. According to this invention, the wiping edge 11 has a thickness gradually increasing from its inner end 16 to its outer end 17, as clearly illustrated. I have found that with a wiper blade of ordinary size (say 9 inches long) good results may be obtained with a wiping edge $\frac{1}{32}$ inch thick at the inner end, tapering to $\frac{3}{32}$ inch thick at the outer end. This form of wiping edge gives a smoother and more efficient wiping action at all times, but especially after a period of use, since wear of the wiping edge is substantially equalized by its variation in thickness according to the speed and distance of travel.

The longitudinal bead 12 of the molded rubber blade abuts the edges 14 of the metal back 15 and so prevents any abrupt bending of the rubber blade and consequent failure thereof adjacent the edges 14. Bead 12 has a sort of rolling bearing upon edges 14 during operation of the wiper and in this manner stiffens up the projecting portion of the rubber blade 10 to the desired extent to give efficient wiping action. Bead 12 also serves the important function of shielding the metal edges 14 and preventing any chance contact of these metal edges 14 with the glass windshield and thereby scratching the same, which sometimes occurs with ordinary types of wipers.

While the form of embodiment of the present invention as herein disclosed, constitutes a preferred form, it is to be understood that other forms might be adopted, all coming within the scope of the claims which follow.

What is claimed is as follows:

1. A windshield wiper comprising: a molded soft rubber blade adapted to be mounted on an operating arm and having a wiping edge increasing in thickness from the end thereof having less distance of travel to the end thereof having a greater distance of travel.

2. A windshield wiper comprising: a soft rubber blade having a wiping edge uniformly tapered in thickness from the end thereof having less travel to the end thereof having greater travel whereby more uniform wiping action is obtained over the length of said blade.

3. A wiper blade comprising a longitudinally extending metal holder and a molded soft rubber strip secured within said metal holder and having a flexible web projecting outwardly from said holder, said projecting web having a wiping edge uniformly tapered in thickness and having a constant section longitudinal bead thereon between said tapered wiping edge and the adjacent edges of said metal holder.

In testimony whereof I hereto affix my signature.

HARVEY D. GEYER.